US006646424B2

(12) United States Patent
Zinn et al.

(10) Patent No.: US 6,646,424 B2
(45) Date of Patent: Nov. 11, 2003

(54) APPARATUS FOR CONVERTING VOLTAGE WITH REGULATOR

(75) Inventors: Raymond D. Zinn, Atherton, CA (US); Andrew Cowell, Kintbury (GB)

(73) Assignee: Micrel, Incorporated, San Jose, CA (US)

( * ) Notice: Subject to any disclaimer, the term of this patent is extended or adjusted under 35 U.S.C. 154(b) by 0 days.

(21) Appl. No.: 10/029,081

(22) Filed: Dec. 21, 2001

(65) Prior Publication Data

US 2003/0117117 A1 Jun. 26, 2003

(51) Int. Cl.⁷ .............................. G05F 1/40; H02J 1/10
(52) U.S. Cl. .......................................... 323/268; 307/24
(58) Field of Search ................................ 323/273, 275, 323/280, 282, 285, 351, 268; 307/18, 24, 28, 43, 52, 82

(56) References Cited

U.S. PATENT DOCUMENTS

| 5,864,225 A | * | 1/1999 | Bryson | 323/268 |
| 6,067,241 A | * | 5/2000 | Lu | 363/65 |
| 6,130,525 A | * | 10/2000 | Jung et al. | 323/268 |
| 6,404,076 B1 | * | 6/2002 | Matsuda et al. | 307/80 |
| 6,404,174 B1 | * | 6/2002 | Boudreaux et al. | 323/273 |

* cited by examiner

Primary Examiner—Adolf D. Berhane
(74) Attorney, Agent, or Firm—Dorsey & Whitney LLP; Edward N. Bachand

(57) ABSTRACT

The present invention provides an apparatus and method for optimizing the efficiency of a switching converter for converting a first voltage to a second voltage. The apparatus includes a regulator, a DC-to-DC converter and a controller. The controller couples with both the regulator and DC-to-DC converter, and the controller is configured to activate and deactivate the regulator and the DC-to-DC converter depending on an output demand. In one embodiment, the controller is configured to activate the regulator and deactivate the DC-to-DC converter when the output demand transitions from a first demand level to a second demand level. The controller is further configured to activate the DC-to-DC converter and to deactivate the regulator when the output demand transitions from the second demand level to the first demand level. The apparatus is configured to monitor demand, and to activate the DC-to-DC converter when demand is in a first state or activate the regulator when demand is in a second state.

33 Claims, 4 Drawing Sheets

APPARATUS FOR CONVERTING VOLTAGE WITH REGULATOR

TECHNICAL FIELD

This invention pertains to a voltage converting method and apparatus, and more particularly to a method and apparatus for converting voltage with a DC to DC switching converter.

BACKGROUND

Many devices and circuits need multiple voltage or current levels to operate. Further, many devices utilize batteries for power, such as portable devices. However, batteries only supply a single voltage level. Therefore, devices and circuits requiring multiple voltage levels often employ DC-to-DC converters to provide the various voltage levels needed.

DC-to-DC switching converters are capable of maintaining a constant output voltage by monitoring the output voltage and adjusting the amount of time energy is supplied to an output. In this manner, an output capacitor remains fully charged under a variety of load conditions. The output can generate a larger output voltage or a smaller output voltage across the capacitor by adjusting the amount of time the DC-to-DC converter stores or delivers energy.

Many devices have DC-to-DC switching converters or switchers that utilize DC-to-DC converters to provide voltage conversion, for example, from a high voltage to a lower voltage. Examples of these devices include, cellular telephones, personal digital assistants (PDA), notebook computers, and many other devices. Often these devices have a plurality of power demands. For example, often these devices have a standby mode or low quiescent state and an active mode, where very little power is needed during standby mode and a significantly larger amount of power is needed in the active mode.

The DC-to-DC converter provides the conversion from a high voltage (for example, 30V) to a lower voltage (for example, 2.5V). When providing conversion, the DC-to-DC converter requires a certain amount of power to operate and provide the conversion. One of the drawbacks with utilizing a DC-to-DC converter is at low power demand the efficiency of the DC-to-DC converter is significantly reduced. As the load current decreases on a DC-to-DC converter its efficiency will decrease as the fixed losses associated with its operation become a larger percentage compared to the output power.

FIG. 1 shows a typical efficiency curve 110 of the operation of a DC-to-DC converter. The vertical axis represents the efficiency of the converter, defined as a percentage of the amount of power needed to operate the DC-to-DC converter versus the power supplied by the DC-to-DC converter. The horizontal axis represents a logarithmic scale of the amount of output current supplied by the DC-to-DC converter. As the amount of output current drops the efficiency begins to drop. As the output current continues to drop the efficiency of the DC-to-DC converter is significantly reduced to well below 80%. Because of the fixed operational power loss associated with the operation of the DC-to-DC converter, the operation power loss becomes a larger percentage of total power as the demand on output power is reduced through a reduction in output current. Hence, the efficiency of the converter decreases when operating to provide lower output currents. Thus operating devices which utilize DC-to-DC converters have a reduced efficiency at times where the output demand is lower, such as in standby mode. This can significantly reduce the operating life of batteries utilized to power devices.

SUMMARY

The present invention provides an apparatus and method for optimizing the efficiency of a switching converter for converting a first voltage to a second voltage. In one embodiment, the apparatus includes a regulator, a converter and a controller. The controller couples with both the regulator and converter, and the controller is configured to activate and deactivate the regulator and the converter depending on an output demand. In one embodiment, the controller is configured to activate the regulator and deactivate the converter when the output demand falls from a first demand level to a second demand level. The controller is further configured to activate the converter and to deactivate the regulator when the output demand rises from the second demand level to the first demand level. The apparatus is configured to monitor the demand, and to activate the converter when the demand is at a first level or activate the regulator when the demand is at a second level. The apparatus is further configured to deactivate the regulator when the demand is at the first level and to deactivate the converter when the demand is at the second level. In one embodiment, the demand is at the second level when operating in a standby mode. In one embodiment, the demand is at the first level when the demand exceeds a threshold.

In one embodiment, the apparatus and method is incorporated into electronic devices which operate at a plurality of voltage levels. These devices include devices operating with energy storage cells, such as batteries. In one embodiment, the apparatus and method of the present invention utilize the bimodal mode of the electronic device to signal the controller to transition between supplying the load from the converter or the regulator.

In one embodiment, the apparatus is implemented on a single integrated circuit, or integrated as part of a larger single integrated circuit.

DETAILED DESCRIPTION

The present apparatus and method provides for increased efficiency for a switching converter. In one embodiment, the apparatus and method provide a low quiescent current solution for switchers. Devices utilizing one or more DC-to-DC converters have a reduced efficiency at low power demands. The novel apparatus and method of the present invention reduces the quiescent power consumption for devices utilizing DC-to-DC switchers when the devices are operating at lower power demands, thus increasing the overall efficiency of the device and increasing the storage life of any power storage device, such as a battery, used to power the device. With the use of a regulator operating in parallel with a switching converter, higher efficiency is achieved during low demand or low load current conditions. As the load current decreases on a DC-to-DC converter, its efficiency will decrease as the fixed losses associated with its operation become a larger percentage compared to the output power. At a threshold or crossing point, the novel apparatus of the present invention turns off or deactivates the converter and turns on or activates a regulator to supply power to the output.

Many applications or electric devices utilizing a switching converter operate in a bimodal mode, with regard to output requirements, where the output requirement is generally low for part of the operating time, such as in a standby mode, and for part of the operating time, there is a higher output demand requirement. Examples of these electric devices include, but are not limited to, cellular phones, personal digital assistant (PDA), notebook computers and other such devices known in the art having bimodal modes. In one embodiment, for maximum efficiency, the converter in the present invention is effectively turned off and put into a low quiescent state, with the output power being supplied from a regulator operating in parallel with the converter.

Figure 1:
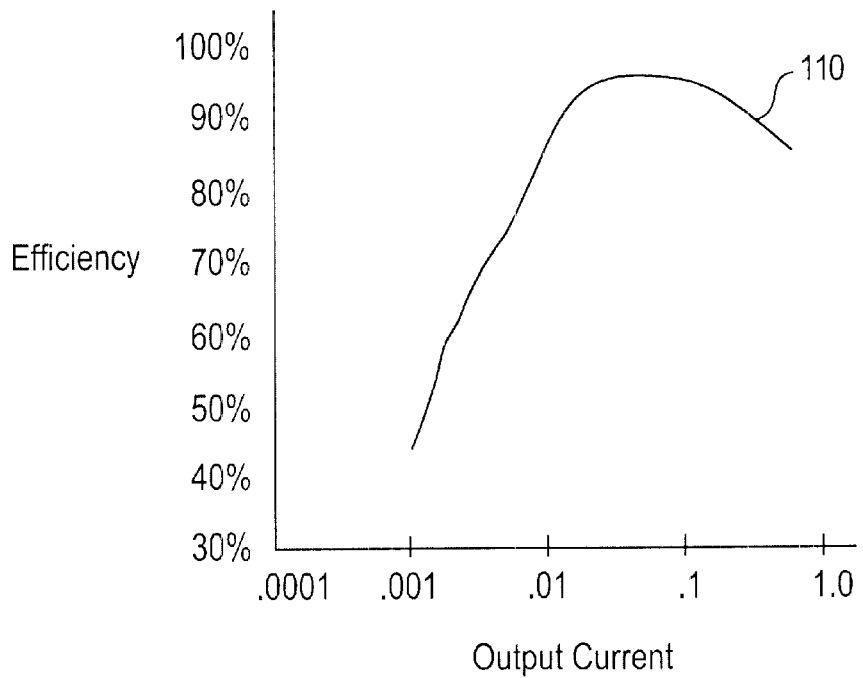
FIG. 1 depicts a graphical representation of the efficiency versus output current of a DC-to-DC converter.
Figure 2:
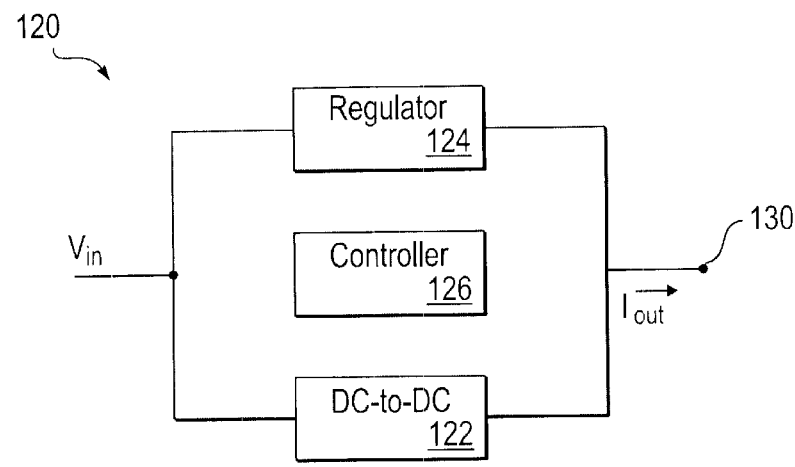
FIG. 2 shows a simplified block diagram of one implementation of one embodiment of the novel apparatus for converting voltage with regulator of the present invention.

FIG. 2 depicts a simplified block diagram of one implementation of one embodiment of the apparatus 120 of the present invention. The apparatus includes a converter 122, such as a DC-to-DC converter and more particularly a DC-to-DC switching converter, and a regulator 124, such as a linear regulator. The converter 122 and the regulator 124 are electrical components well known in the art. As such, the internal operation of these devices will not be further described. The apparatus 120 further includes a controller 126 electrically coupled with both the DC-to-DC converter 122 and the regulator 124. In operation, the controller 126 activates and deactivates both the DC-to-DC converter 122 and the regulator 124 depending on the power demand placed on the apparatus 120. As the demand for power drops, the apparatus 120 shifts from supplying power through the converter 122 to supplying power through the regulator 124. The controller may be implemented using any of several topologies including, without limitation, gate logic, state machine, processor and/or microprocessor, dedicated analog design including CMOS and/or bipolar devices, and substantially any other control structure known in the art. One of the simplest implementations of controller 126 is that of a change over switch (COS), wherein an external signal determines a mode of operation for the DC-to-DC converter 122.

Figure 3:
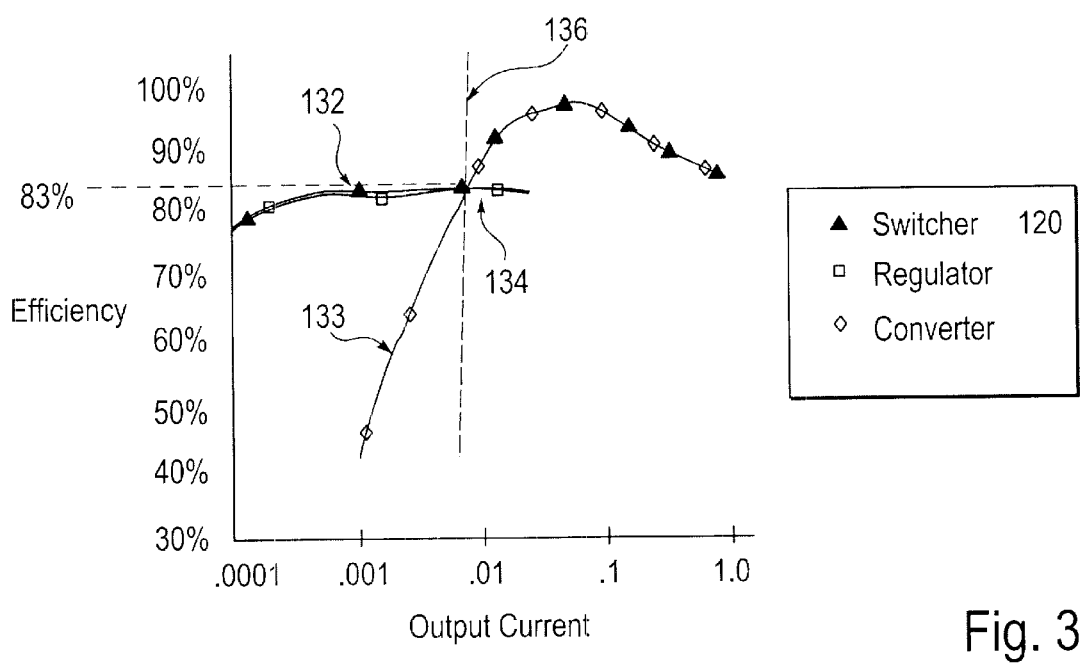
FIG. 3 depicts a graphical representation of the efficiency versus current of the apparatus for converting voltage with regulator of FIG. 2.

FIG. 3 shows a graphical representation of the apparatus efficiency 132 of the present invention versus output current (on a logarithmic scale), where the apparatus efficiency 132 combines the efficiency of both the DC-to-DC converter efficiency 133 and the voltage regulator efficiency 134. In one embodiment, the apparatus switches to the regulator at substantially any time or current level where the regulator efficiency is greater than the converter efficiency. As is shown in FIG. 3, the voltage regulator efficiency 134 has a relatively level and constant efficiency which is much greater than the DC-to-DC converter efficiency 133 at lower current output demands, for one example, below approximately 5 mA in the example shown. In one embodiment, the present inventive apparatus 120 optimizes efficiency by including both the DC-to-DC converter 122 and the regulator 124. The apparatus 120 independently activating each of the converter 122 and regulator 124 depending on the output demand. As the demand falls below a threshold 136, the controller 126 deactivates the DC-to-DC converter 122 and activates the regulator 124. Thus, even at low current demands, the apparatus 120 maintains an optimal efficiency 132.

In one embodiment, the apparatus 120 utilizes a dual mode or bimodal operation of the devices which implements the novel apparatus 120. When a device utilizing the novel apparatus 120 is active and operating, such as a cellular phone being actively utilized in making a call, the power demand is relatively high, as compared to a standby mode or low quiescent state where the phone is inactive and waiting to receive or send a call. Thus, the controller 126 activates the DC-to-DC converter 122 to supply and control the output 130 of the apparatus while the device is in an active mode. When the device implementing the apparatus 120 is in standby mode, the power demand is relatively low, resulting in a reduced efficiency if the DC-to-DC converter were continued to be utilized. Thus, the controller 126 deactivates the DC-to-DC converter 122, in one embodiment putting the converter 122 into a low quiescent state, and activates the regulator 124 to supply and control the output 130. By switching between the DC-to-DC converter and the regulator the apparatus 120 optimizes efficiency 132.

Figure 4:
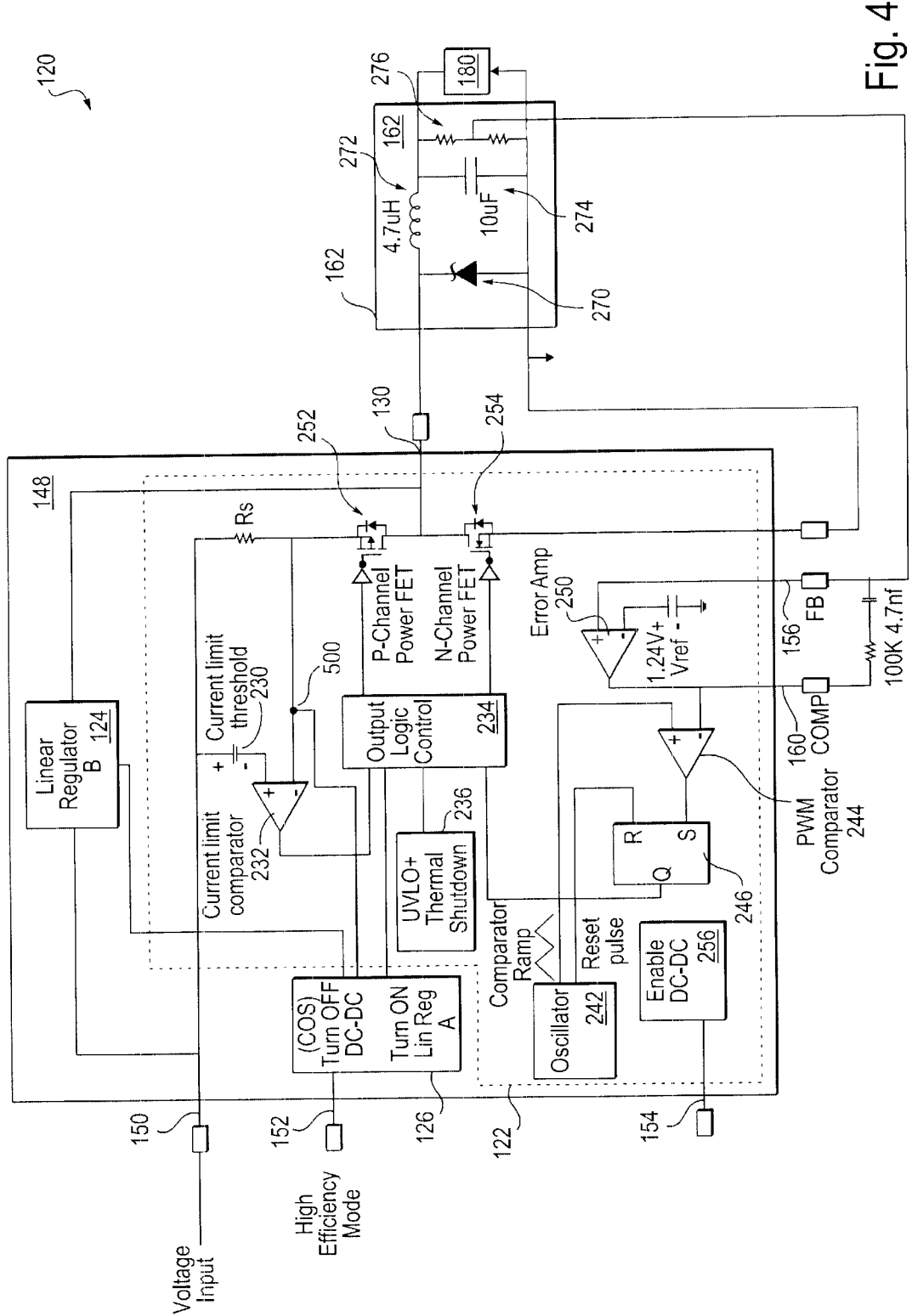
FIG. 4 depicts a simplified block diagram of one embodiment of the apparatus for converting voltage with regulator of FIG. 2 implemented on a single integrated circuit.

FIG. 4 depicts one implementation of one embodiment of the apparatus 120 where the apparatus is incorporated into a single integrated circuit 148. The apparatus 120 includes a plurality of input nodes including a voltage input node 150, a mode input node 152 and an enable node 154. The voltage input node 150 receives the input voltage at a first level from a power source to be converted to a voltage at a second level by the apparatus 120. In one embodiment, the mode input node 152 couples with the controller 126 and provides a signal to the controller to indicate in which mode of operation the device incorporating the apparatus is operating. For example, if the device has an active mode and a standby mode, the mode input node 152 receives a signal designating the mode. The mode input node 152 forwards the mode of operation to the controller 126 such that the controller activates and deactivates the DC-to-DC converter and regulator accordingly to optimize efficiency. In one embodiment, the mode input node152 receives a feedback signal which signals the controller 126 when the output demand crosses a threshold level signaling the controller to cause a transition between the DC-to-DC converter 122 and the regulator 124. The enable input node 154 provides an override signal which allows the apparatus 120 and/or the DC-to-DC converter 122 to be activated or deactivated according to external parameters and conditions.

In one embodiment, the apparatus 120 further includes a feedback input node 156 and a comparator input node 160. The feedback input and comparator input allow the apparatus 120 to monitor the resulting output 130 and adjust the output 130 to maintain the desired output voltage level. In one embodiment, controller 126 is also coupled with node 500 to sample a signal representing the output current and allow the controller to activate and deactivate the DC-to-DC converter 122 and the regulator 124 based on the power demands from the load (not shown). In this case, the signal representing the output current sampled at node 500, governs the activation an deactivation of converter 122 and regulator 124. While a signal representing the output current can be advantageously sampled at node 500, any node or source may be used. Referring back to FIG. 3, a signal representing the output current generally represents the function of threshold level 136. Referring to FIG. 4, in one embodiment, the output 130 couples with output passive and energy storage elements 162 which are shown as being external to the integrated DC-to-DC converter 122, regulator 124 and controller 126. Passive and energy storage elements are integral parts of any DC-to-DC converter and are commonly utilized in the art, thus their operation will not be further described.

Still referring to FIG. 4, in one embodiment, the converter 122 includes current limiting comparator 232 which couples at a positive terminal to the voltage input 140 through a threshold voltage 230. The negative terminal of the limiting comparator 232 couples with the voltage input node 150 through a resistance Rs providing a voltage drop from the input voltage. The output of the limiting comparator 232 couples with an output logic control 234. A thermal shutdown 236 couples with the output logic control 234 to signal the output logic control to prevent further sourcing of the output 130 if temperature thresholds are exceeded. An oscillator 242 couples with a negative input of a pulse width modulation (PWM) comparator 244. The positive input of the PWM comparator 244 couples with the output of an error amplifier 250. The positive input of the error amplifier couples with the feedback 156 and the negative input couples with ground through a voltage reference. The output of the PWM comparator 244 couples with a set input of a latch 246. The oscillator 242 further couples with a reset input of the latch 246 to reset the latch. The output of the latch 246 couples with the output logic control 234. The output logic control 234 couples with a P-channel FET 252 and an N-channel FET 254 through inverters, and controls the time each FET is on to supply the high or low voltage to generate the output 130.

In one embodiment, the output passive and energy storage elements 162 includes a diode 270 coupled between the output 130 and a low or ground voltage. An inductor 272 further couples with the output and an output capacitor 274 that couples between the inductor and ground. A resistance 276 couples in parallel to the output capacitor 274. The load 180 further couples in parallel with the output capacitor 274 and the resistance 276.

Figure 5:
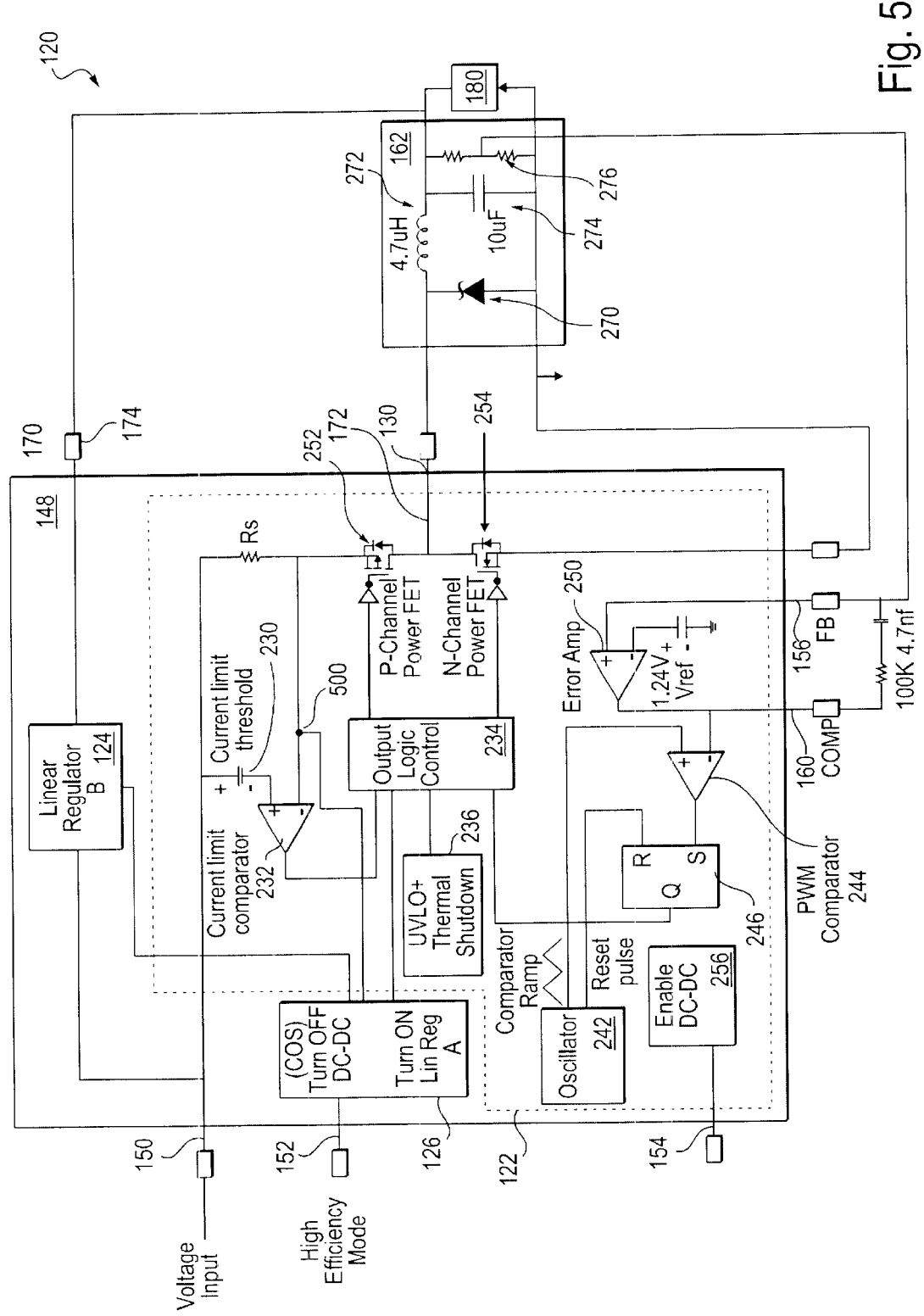
FIG. 5 depicts a simplified block diagram of another embodiment of the apparatus for converting voltage with regulator of FIG. 2 implemented on a single integrated circuit.

FIG. 5 depicts one implementation of one embodiment of the apparatus 120 wherein the apparatus 120 includes an additional regulator output 170. This implementation allows the regulator output 170 to couple with the load 180 without requiring the regulator output 170 to pass through the passive and energy storage elements 162 of the DC-to-DC converter. Thus the efficiency of the apparatus 120 is further increased. When the apparatus is implemented in a single integrated circuit 148, the integrated circuit includes an additional regulator output pin, or node 174 allowing the regulator output 170 to be coupled directly to the output and not through the passive and energy storage elements 162.

The novel method and apparatus improves the efficiency of switchers. In one embodiment, as the demand for power increases and crosses a threshold 136, the controller 126 activates the DC-to-DC converter 122 and deactivates the regulator 124. Further, as the demand for power decreases and crosses a threshold, the controller 126 activates the regulator 124 and deactivates the DC-to-DC converter 126. In one embodiment, the controller activates the DC-to-DC converter when the electronic device implementing the novel apparatus 120 is in an active mode of operation, and deactivates the regulator. Additionally, the controller 126 activates the regulator 124 when the device implementing the apparatus 120 is in a standby mode of operation, and deactivates the DC-to-DC converter 122.

Efficiency is a critical feature of battery powered equipment. Output load currents often span a large range. The present inventive method and apparatus achieves high efficiency voltage conversion from a first voltage level to a second voltage level during low output current demands through the use of a regulator, and in larger output current demands through a DC-to-DC converter resulting in an increased life of an energy storage device.

As can be seen from the foregoing, the present invention provides an apparatus and method for optimizing efficiency of a voltage switching converter even at low power demands. The present invention optimizes efficiency by utilizing a DC-to-DC converter to supply power when demand is high, and utilizing a linear regulator operating in parallel with the DC-to-DC converter to supply power when demand is low. The present invention can be used for voltage conversion from a first voltage level to a second voltage level in substantially any device utilizing two or more voltage levels.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above disclosure. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for converting an electrical variable, comprising:

an output having one of a purality of states;

a regulator coupled to the output and configured to influence the electrical variable at the output;

a converter coupled to the output and configured to influence the electrical variable at the output; and a controller coupled with the regulator and the converter, the controller being configured to activate and deactivate the regulator and the converter as a function of the state of the output.

2. The apparatus as claimed in claim 1, wherein:

the controller is configured to activate the regulator and deactivate the converter when operating in a first state.

3. The apparatus as claimed in claim 2, wherein:

the controller is configured to deactivate the regulator and activate the converter when operating in a second state.

4. The apparatus as claimed in claim 3, wherein:

the first state is a standby state; and the second state is an active state.

5. The apparatus as claimed in claim 3, wherein:

the first state exists when a demand at the output is at a first level;

the second state exists when the demand at the output is at a second level; and the first level is less than the second level.

6. The apparatus as claimed in claim 3, wherein:

the controller is configured to activate the regulator and deactivate the converter when an output demand is below a threshold level; and the controller is configured to activate the converter and deactivate the regulator when the output demand is greater than or equal the threshold level.

7. The apparatus as claimed in claim 6, wherein:
the regulator is a linear voltage regulator.

8. The apparatus as claimed in claim 7, wherein:
the converter is a DC-to-DC converter.

9. The apparatus as claimed in claim 7, wherein:
the converter is a DC-to-DC switching converter.

10. The apparatus as claimed in claim 1, wherein:
the regulator and the converter are incorporated on a single integrated circuit.

11. An apparatus for converting an input voltage from a first voltage level to a second voltage level, comprising:
an output having one of a plurality of states:
a regulator coupled to the output and configured to provide power at the output;
a DC-to-DC converter coupled to the output and configured to provide power at the output; and
a controller coupled with both the regulator and the DC-to-DC converter, wherein the controller is configured to activate and deactivate the regulator and the DC-to-DC converter as a function of the state of the output.

12. The apparatus as claimed in claim 11, wherein:
the controller is configured to activate and deactivate the regulator and the DC-to-DC converter depending on an output demand.

13. The apparatus as claimed in claim 12, wherein:
the controller is configured to activate the regulator when the output demand falls from a first demand level to a second demand level.

14. The apparatus as claimed in claim 13, wherein:
the controller is configured to deactivate the DC-to-DC converter when the output demand falls from the first demand level to the second demand level.

15. The apparatus as claimed in claim 12, wherein:
the controller is configured to activate the DC-to-DC converter when the output demand rises from a second demand level to a first demand level.

16. The apparatus as claimed in claim 15, wherein:
the controller is configured to deactivate the regulator when the output demand rises from the second demand level to the first demand level.

17. A apparatus for converting a first reference voltage at a first voltage level to an output voltage at a second voltage level that is less than the first voltage level, the apparatus comprising:
a DC-to-DC converter coupled to the first reference voltage;
a regulator coupled to the first reference voltage; and
a controller coupled with the DC-to-DC converter and the regulator, the controller being configured to signal a first state in which the DC-to-DC converter supplies the output voltage and a second state in which the regulator supplies the output voltage.

18. The electronic device as claimed in claim 17, wherein:
the first state occurs when the electronic device is in an active mode; and
the second state occurs when the electronic device is in a standby mode.

19. The electronic device as claimed in claim 18, wherein:
the DC-to-DC converter and the regulator are formed on a single integrated circuit.

20. The electronic device as claimed in claim 19, wherein:
the controller is formed on the single integrated circuit.

21. The electronic device as claimed in claim 20, further comprising:
at least one output energy storage element configured to at least in part supply the output voltage;
the DC-to-DC converter being coupled with the at least one output energy storage element such that the output voltage is supplied to a load through the at least one output energy storage element; and
the regulator being coupled with the load such that the output voltage is supplied to the load from the regulator and not through the at least one energy store storage element.

22. The electronic device as claimed in claim 17, wherein:
the regulator is a linear regulator.

23. The electronic device as claimed in claim 22, wherein:
the first state occurs when an output demand is greater than a threshold level, and the second state occurs when the output demand is less than or equal to the threshold level.

24. A method for optimizing the efficiency of an apparatus having a converter, a regulator, and first and second states for converting an electrical variable to an output, comprising the steps of:
deactivating the regulator and supplying the output from the converter when the apparatus is in the first state; and
deactivating the converter and supplying the output from the regulator when the apparatus is in the second state.

25. The method as claimed in claim 24, wherein:
the first state exists when the apparatus is operating in an active mode.

26. The method as claimed in claim 25 for use when the apparatus experiences a demand, wherein:
the second state exists when the demand is below a threshold.

27. A method for use with an apparatus having a converter and a regulator and an output to provide voltage conversion from a first voltage level to a second voltage level, comprising the steps of:
monitoring the demand on the output;
deactivating the regulator and activating the converter to supply the output when the demand is at a first level; and
deactivating the converter and activating the regulator to supply the output when the demand is at a second level.

28. The method as claimed in claim 27, wherein:
the demand is at the second level when the apparatus is operating in a standby mode.

29. The method as claimed in claim 27, further comprising the step of:
deactivating the regulator when the demand is at the first level; and
deactivating the converter when the demand is at the second level.

30. The method as claimed in claim 29, wherein:
the demand is at the first level when the demand exceeds a threshold.

31. The method as claimed in claim 27, further comprising the step of:
optimizing an efficiency of the voltage conversion by alternately activating and deactivating the converter and the regulator.

32. A system for use with a DC-to-DC converter, the system being coupleable to a load requiring at least one of high load current and low load current the system functioning to promote efficiency of said DC-to-DC converter, the system comprising:

a linear regulator coupleable in parallel with said DC-to-DC converter, the linear regulator being coupleable to the load;

a controller coupled to at least one of said DC-to-DC converter and said linear regulator, comprising;
  a regulator control node coupled to control operation of said linear regulator;
  a sense node coupled to sense magnitude of said load current;
  a converter node coupled to an input of said converter;
  said controller operable to deactivate said DC-to-DC converter and activate said linear regulator when sensed magnitude of said load current indicates low load current;

wherein conversion efficiency of said DC-to-DC converter is enhanced.

33. The system of claim 32, wherein said controller comprises a change over switch.

* * * * *